US007006547B2

(12) United States Patent
Steiger et al.

(10) Patent No.: US 7,006,547 B2
(45) Date of Patent: Feb. 28, 2006

(54) VERY HIGH REPETITION RATE NARROW BAND GAS DISCHARGE LASER SYSTEM

(75) Inventors: Thomas D. Steiger, San Diego, CA (US); Edward P. Holtaway, Carlsbad, CA (US); Bryan Moosman, San Marcos, CA (US); Rajasekhar M. Rao, San Diego, CA (US)

(73) Assignee: Cymer, Inc., San Diego, CA (US)

( * ) Notice: Subject to any disclaimer, the term of this patent is extended or adjusted under 35 U.S.C. 154(b) by 0 days.

(21) Appl. No.: 10/815,386

(22) Filed: Mar. 31, 2004

(65) Prior Publication Data

US 2005/0226300 A1 Oct. 13, 2005

(51) Int. Cl.
*H01S 3/22* (2006.01)

(52) U.S. Cl. ............................... 372/55; 372/57; 372/4

(58) Field of Classification Search .................. 372/55, 372/57

See application file for complete search history.

(56) References Cited

U.S. PATENT DOCUMENTS 4,599,726 A * 7/1986 Telle ............................. 372/4

(Continued)

*Primary Examiner*—Minsun Oh Harvey
*Assistant Examiner*—Dung (Michael) T. Nguyen
(74) *Attorney, Agent, or Firm*—William C. Cray

(57) ABSTRACT

A method and apparatus for producing a very high repetition rate gas discharge laser system in a MOPA configuration is disclosed which may comprise a master oscillator gas discharge layer system producing a beam of oscillator laser output light pulses at a very high pulse repetition rate; at least two power amplification gas discharge laser systems receiving laser output light pulses from the master oscillator gas discharge laser system and each of the at least two power amplification gas discharge laser systems amplifying some of the received laser output light pulses at a pulse repetition that is a fraction of the very high pulse repetition rate equal to one over the number of the at least two power amplification gas discharge laser systems to form an amplified output laser light pulse beam at the very high pulse repetition rate, which may be positioned in series with respect to the oscillator laser output light pulse beam. The apparatus and method may further comprise a beam delivery unit connected to the laser light output of the power amplification laser system. The apparatus and method may be a very high repetition rate gas discharge laser system in a MOPO configuration. The apparatus and method may comprise a compression head comprising a compression head charge storage device being charged at x times per second; a gas discharge chamber comprising at least two sets of paired gas discharge electrodes; at least two magnetically saturable switches, respectively connected between the compression head charge storage device and one of the at least two sets of paired electrodes and comprising first and second opposite biasing windings having a first biasing current for the first biasing winding and a second biasing current for the second biasing winding and comprising a switching circuit to switch the biasing current from the first biasing current to the second biasing current such that only one of the at least two switches receives the first biasing current at a repetition rate equal to x divided by the number of the at least two sets of paired electrodes while the remainder of the at least two magnetically saturable switches receives the second biasing current. The apparatus and method may be utilized as a lithography tool or for producing laser produced plasma EUV light.

60 Claims, 9 Drawing Sheets

U.S. PATENT DOCUMENTS

| | | | | |
|---|---|---|---|---|
| 5,023,884 | A | 6/1991 | Akins et al. | 372/57 |
| 5,025,445 | A | 6/1991 | Anderson et al. | 372/20 |
| 5,025,446 | A | 6/1991 | Kuizenga | 372/21 |
| 5,126,876 | A * | 6/1992 | O'Meara | 359/338 |
| 5,189,678 | A | 2/1993 | Ball et al. | 372/28 |
| 5,313,481 | A | 5/1994 | Cook et al. | 372/37 |
| 5,315,611 | A | 5/1994 | Ball et al. | 372/56 |
| 5,359,620 | A | 10/1994 | Akins | 372/58 |
| 5,448,580 | A | 9/1995 | Birx et al. | 372/38 |
| 5,471,965 | A | 12/1995 | Kapich | 123/565 |
| 5,852,621 | A | 12/1998 | Sandstrom | 372/25 |
| 5,863,017 | A | 1/1999 | Larson et al. | 248/176.1 |
| 5,953,360 | A | 9/1999 | Vitruk et al. | 372/87 |
| 5,978,394 | A | 11/1999 | Newman et al. | 372/32 |
| 5,991,324 | A | 11/1999 | Knowles et al. | 372/57 |
| 6,005,879 | A | 12/1999 | Sandstrom et al. | 372/25 |
| 6,016,325 | A | 1/2000 | Ness et al. | 372/38 |
| 6,018,537 | A | 1/2000 | Hofmann et al. | 372/25 |
| 6,028,880 | A | 2/2000 | Carlesi et al. | 372/58 |
| 6,067,311 | A | 5/2000 | Morton et al. | 372/57 |
| 6,094,448 | A | 7/2000 | Fomenkov et al. | 372/102 |
| 6,104,735 | A | 8/2000 | Webb | 372/37 |
| 6,128,323 | A | 10/2000 | Myers et al. | 372/38 |
| 6,151,349 | A | 11/2000 | Gong et al. | 372/58 |
| 6,164,116 | A | 12/2000 | Rice et al. | 73/1.72 |
| 6,192,064 | B1 | 2/2001 | Algots et al. | 372/99 |
| 6,208,674 | B1 | 3/2001 | Webb et al. | 372/57 |
| 6,208,675 | B1 | 3/2001 | Webb | 372/58 |
| 6,212,211 | B1 | 4/2001 | Azzola et al. | 372/33 |
| 6,219,368 | B1 | 4/2001 | Govorkov | 372/59 |
| 6,240,117 | B1 | 5/2001 | Gong et al. | 372/58 |
| 6,314,119 | B1 | 11/2001 | Morton | 372/57 |
| 6,317,447 | B1 | 11/2001 | Partlo et al. | 372/57 |
| 6,330,261 | B1 | 12/2001 | Ishihara et al. | 372/38.1 |
| 6,414,979 | B1 | 7/2002 | Ujazdowski et al. | 372/87 |
| 6,477,193 | B1 | 11/2002 | Oliver et al. | 372/58 |
| 6,535,531 | B1 | 3/2003 | Smith et al. | 372/25 |
| 6,549,551 | B1 * | 4/2003 | Ness et al. | 372/38.07 |
| 6,567,450 | B1 | 5/2003 | Myers et al. | 372/55 |
| 6,625,191 | B1 | 9/2003 | Knowles et al. | 372/55 |
| 6,690,704 | B1 | 2/2004 | Fallon et al. | 372/58 |
| 6,693,939 | B1 | 2/2004 | Klene et al. | 372/58 |
| 6,704,339 | B1 | 3/2004 | Lublin et al. | 372/57 |
| 6,704,340 | B1 | 3/2004 | Ershov et al. | 372/58 |

* cited by examiner

VERY HIGH REPETITION RATE NARROW BAND GAS DISCHARGE LASER SYSTEM

FIELD OF THE INVENTION

The present invention relates to gas discharge lasers, e.g., used to provide narrow band light, e.g., for integrated circuit lithography purposes, which requires not only narrow band light but also high stability in such things as center wavelength and bandwidth over, e.g., large ranges of output pulse repetition rates and at very high pulse repetition rates.

BACKGROUND OF THE INVENTION

The present application is related to U.S. Pat. No. 6,704,339, entitled LITHOGRAPHY LASER WITH BEAM DELIVERY AND BEAM POINTING CONTROL, with inventor(s) Lublin, et al., issued on Mar. 9, 2004, based on an application Ser. No. 10/233,253, filed on Aug. 30, 2002, U.S. Pat. No. 6,704,340, entitled LITHOGRAPHY LASER SYSTEM WITH IN-PLACE ALIGNMENT TOOL, with inventor(s) Ershov et al., issued on Mar. 9, 2004, based on an application Ser. No. 10/255,806, filed on Sep. 25, 2002, U.S. Pat. No. 6,690,704, entitled CONTROL SYSTEM FOR A TWO CHAMBER GAS DISCHARGE LASER, with inventor(s) Fallon et al., issued on Feb. 10, 2004, based on an application Ser. No. 10/210,761, filed on Jul. 31, 2002, U.S. Pat. No. 6,693,939, entitled SIX TO TEN KHZ, OR GREATER GAS DISCHARGE LASER SYSTEM, with inventor(s) Watson et al. issued on Feb. 17, 2004, based on an application Ser. No. 10/187,336, filed on Jun. 28, 2002, and United States Published Patent Application No. 2002/0191654A1, entitled LASER LITHOGRAPHY LIGHT SOURCE WITH BEAM DELIVERY, with inventor(s) Klene et al., published on Dec. 19, 2002, based on an application Ser. No. 10/141,216, filed on May 7, 2002, the disclosure of each of which is hereby incorporated by reference.

The present application is also related to U.S. Pat. Nos. 6,625,191, entitled VERY NARROW BAND, TWO CHAMBER, HIGH REP RATE GAS DISCHARGE LASER SYSTEM, issued to Knowles, et al. on Sep. 23, 2003, and 6,549,551, entitled INJECTION SEEDED LASER WITH PRECISE TIMING CONTROL issued to Ness, et al. on Apr. 15, 2003, and U.S. Pat. No. 6,567,450, entitled VERY NARROW BAND, TWO CHAMBER, HIGH REP RATE GAS DISCHARGE LASER SYSTEM, issued to Myers, et al. on May 20, 2003, the disclosures of each of which is hereby incorporated by reference.

SUMMARY OF THE INVENTION

A method and apparatus for producing a very high repetition rate gas discharge laser system in a MOPA configuration is disclosed which may comprise a master oscillator gas discharge layer system producing a beam of oscillator laser output light pulses at a very high pulse repetition rate; at least two power amplification gas discharge laser systems receiving laser output light pulses from the master oscillator gas discharge laser system and each of the at least two power amplification gas discharge laser systems amplifying some of the received laser output light pulses at a pulse repetition that is a fraction of the very high pulse repetition rate equal to one over the number of the at least two power amplification gas discharge laser systems to form an amplified output laser light pulse beam at the very high pulse repetition rate. The at least two power amplification gas discharge laser systems may comprise two power amplification gas discharge laser systems which may be positioned in series with respect to the oscillator laser output light pulse beam. The apparatus and method may further comprise a beam delivery unit connected to the laser light output of the power amplification laser system and directing to output of the power amplification laser system to an input of a light utilization tool and providing at least beam pointing and direction control. The apparatus and method may be a very high repetition rate gas discharge laser system in a MOPO configuration which may comprise: a first line narrowed gas discharge laser system producing a first laser output light pulse beam at a pulse repetition rate of ≧2000 Hz; a second line narrowed gas discharge laser system producing a second laser output light pulse beam at a pulse repetition rate of ≧2000 Hz; a beam combiner combining the first and second output light pulse beams into a combined laser output light pulse beam with a ≧4000 Hz pulse repetition rate. The apparatus and method may comprise a compression head comprising a compression head charge storage device being charged at x times per second; a gas discharge chamber comprising at least two sets of paired gas discharge electrodes; at least two magnetically saturable switches, respectively connected between the compression head charge storage device and one of the at least two sets of paired electrodes and comprising first and second opposite biasing windings having a first biasing current for the first biasing winding and a second biasing current for the second biasing winding and comprising a switching circuit to switch the biasing current from the first biasing current to the second biasing current such that only one of the at least two switches receives the first biasing current at a repetition rate equal to x divided by the number of the at least two sets of paired electrodes while the remainder of the at least two magnetically saturable switches receives the second biasing current. The apparatus and method may be utilized as a lithography tool or for producing laser produced plasma EUV light.

DETAILED DESCRIPTION OF PREFERRED EMBODIMENTS

Figure 1:
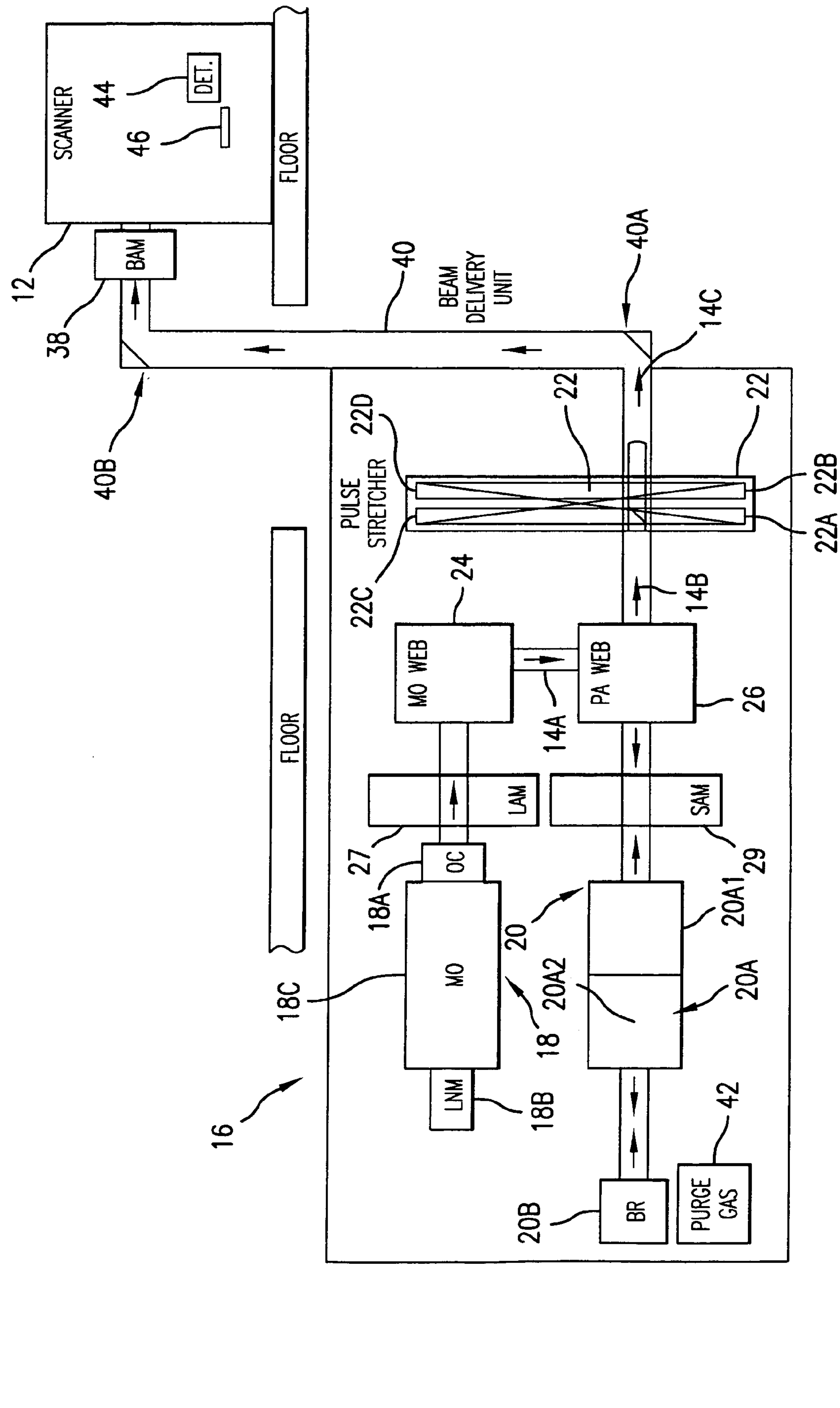
FIG. 1 shows a schematic view of a very high repetition rate laser system according to aspects of an embodiment of the present invention delivering light to a lithography tool.

Turning now to FIG. 1 there is shown a schematic view of a very high repetition rate laser system 10. The laser system 10 may delivery light, e.g., DUV light, to a lithography tool, e.g., a scanner or stepper/scanner 12. The light, e.g., DUV light, source may comprise, e.g., a two chamber laser system comprising, e.g., a master oscillator laser system 18, the output of which is a narrow band laser output pulse beam 14A. The master oscillator 18 system may comprise a master oscillator laser gas discharge chamber 18*c*, an output coupler 18*a* and a line narrowing module 18B together forming the oscillator cavity for the master oscillator laser system 18.

The system 10 may also comprise, e.g., a power amplification system 20, which may comprise, e.g., a pair of power amplification laser chambers 20A, 20A1 and 20A2, which may, e.g., be in series with each other, such that the master oscillator laser system 18 output light pulse beam passes first through chamber 20A1 and then through chamber 20A2 (both of which could be formed into a single chamber 20A) and to a beam reflector 20B creating a second pass of the beam 14A through the chamber(s) 20A1 and 20A2 in reverse order of the first pass to form power amplification system 20 output laser light pulse beam 14B.

The output beam 14A may pass from the output coupler 18*a* of the master oscillator laser system 18 through a line center analysis module 27 that, e.g., measures the center wavelength of the narrow band light output of the master oscillator and then through a master oscillator wavefront engineering box, which may incorporate, e.g., relay optics or portions thereof to relay the output beam 14A to a power amplification wavefront engineering box 26 that redirects the beam 14A into the power amplification laser system 20 as explained in more detail below.

The output of the power amplification laser system 20 may then pas through a spectral analysis module that, e.g., measures the bandwidth of the output beam 14B and through a pulse stretcher 22, comprising, e.g., multiple reflecting mirrors 22*a*–D that may, e.g., increase the total integrated spectrum ("TIS") of the output beam 14B to form an output beam 14C that may be, e.g., delivered to the lithography tool 12 through, e.g., a beam delivery unit 40. The beam delivery unit 40 may comprise, e.g., mirrors 40A and B at least one of which may be a fast acting beam directing mirror to modify, e.g., the beam direction and pointing of the output beam 14C as it enters the lithography tool. A beam analysis module 38 may be positioned, e.g., essentially at the input of the light to the lithography tool 12, e.g., measuring beam intensity, direction and pointing as it enters the lithography tool 12.

The lithography tool may have, e.g., beam intensity and quality detectors 44, 46, that may, e.g., provide feedback to the laser system 10 controller (not shown) Similarly outputs from the LAM 27, SAM 29 and BAM 38 may be used by the laser system control for such things as controlling charging voltage and/or firing timing between the MO and PA systems and gas injection into either or both of the MO and PA systems. The laser system may also include a purge gas system to purge one or more elements in the LAM 27, SAM 28, MOWEB 24, PA WEB 26, pulse stretcher 22 and/or beam delivery unit 40.

Figure 2A:
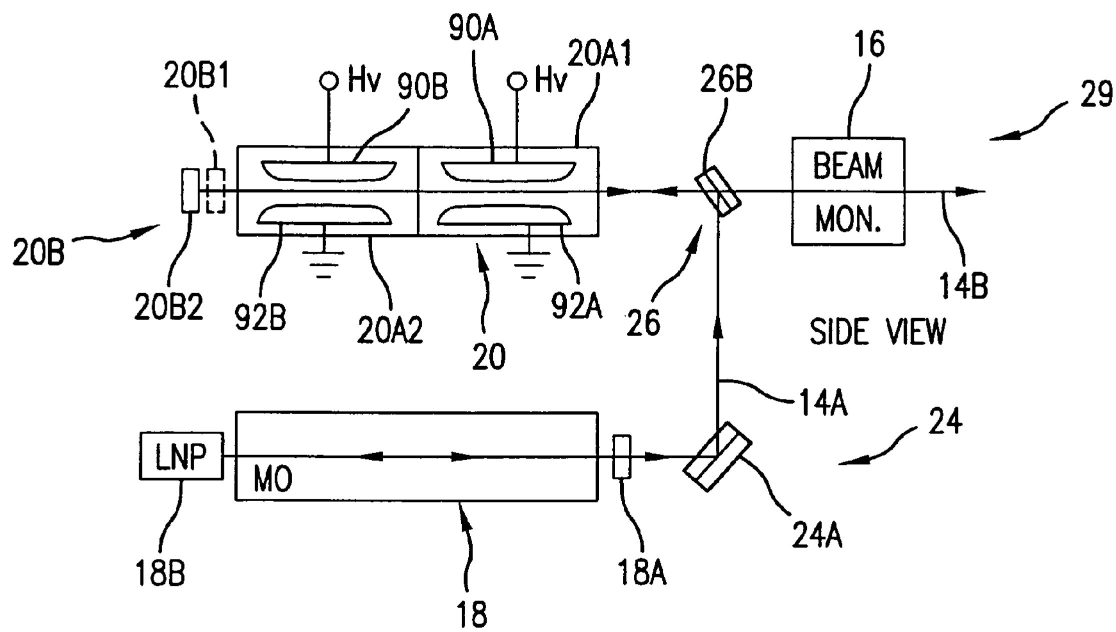
FIGS. 2A and 2B, respectively show a schematic side view and plan view of aspects of an embodiment of the present invention.
Figure 2B:
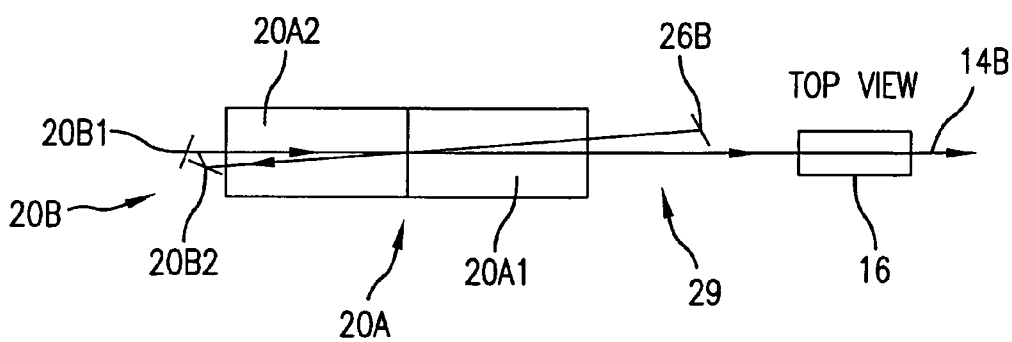

As shown schematically in FIG. 2*a*, the output beam 14A from the MO 18 may pass through the output coupler 18A and be reflected by an essentially totally reflecting mirror 24A in the MO WEB 24 to another essentially totally reflecting mirror 26B in the PA WEB 26. It will be understood that the beam detector 16 in the PA WEB 26 is shown schematically out of place in the optical path of the output beam 14B of the PA system 20 for clarity sake. Turning to FIG. 2B there is shown schematically the fact that in a top plan view, the mirror 26B is slightly out of the optical axis of the PA output beam 14B and reflects the output beam 14A from the MO system 18 through the PA system 20 at a slight angle to the optical and discharge longitudinal centerline axis of the PA. In the embodiment shown illustratively, where the PA laser system may be in two chambers or a single chamber, the tilted path may intersect the longitudinal centerline optical and discharge axes of a pair of electrode pairs 90A, 92A and 90B, 92B, and then be reflected by, e.g., two essentially totally reflecting mirrors 20B1 and 20B2 in the beam reflecting module 20B back through the PA system 20 chambers 20A2 and 20A1 in that order, essentially along the longitudinal centerline optical and gas discharge axis of the electrodes 90A, 92A and 90B, 92B. This may simplify the optics utilized and at the same time optimize the utilization of the amplification occurring in the discharge regions between the electrode pairs, 90A, 92A and 90B, 92B respectively. It will be understood by those skilled in the art that the respective MO chamber and PA chamber(s) are not drawn in this schematic view to any kind of scale, e.g., in longitudinal length.

Figure 3A:
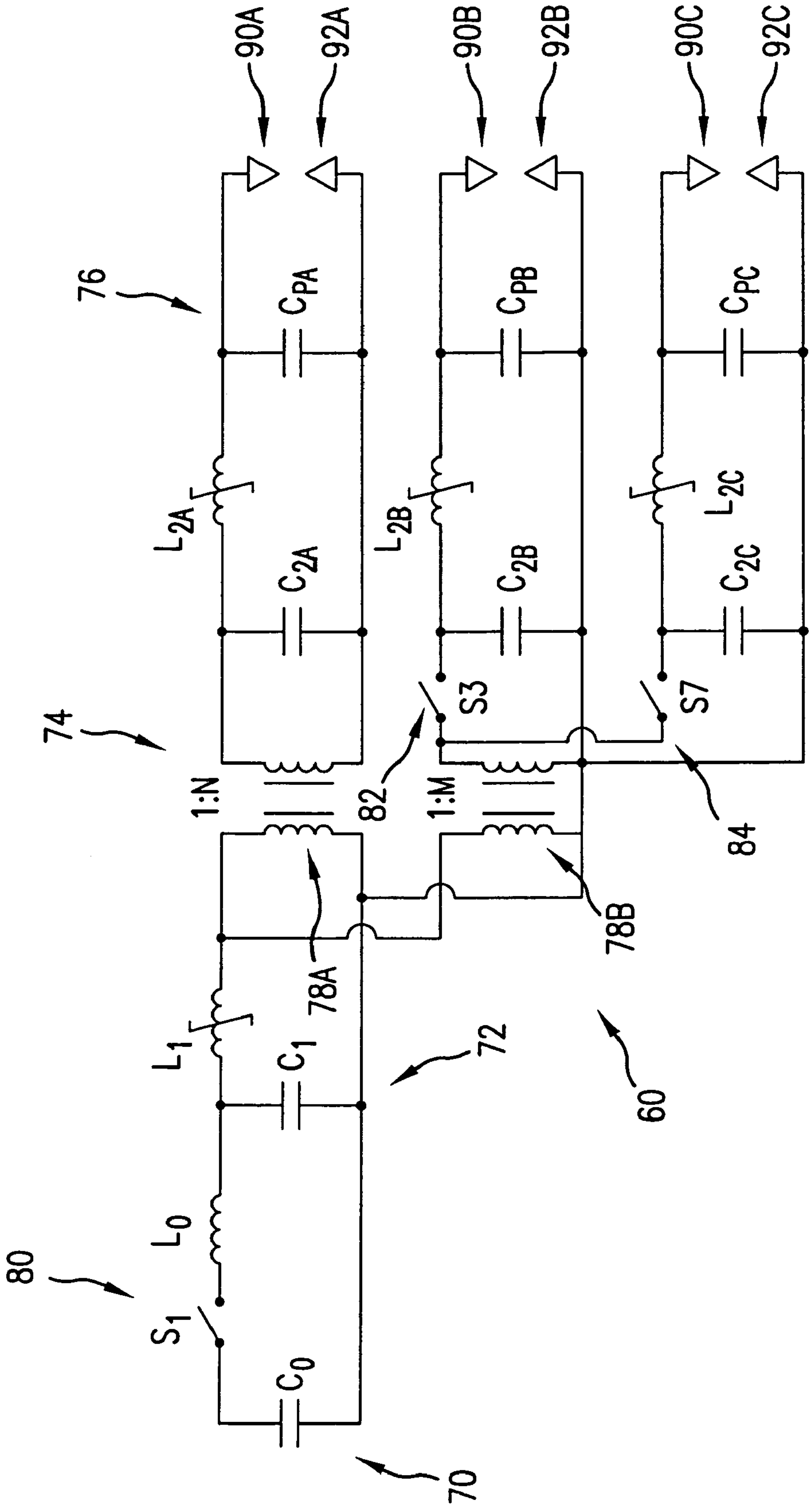
FIGS. 3A–C show schematically alternative embodiments of a solid state pulse power system module according to aspects of an embodiment of the present invention; and, FIG. 4 shows a timing diagram illustrative of a timing of firing between an oscillator laser and an amplifier laser according to aspects of an embodiment of the present invention.
Figure 3B:
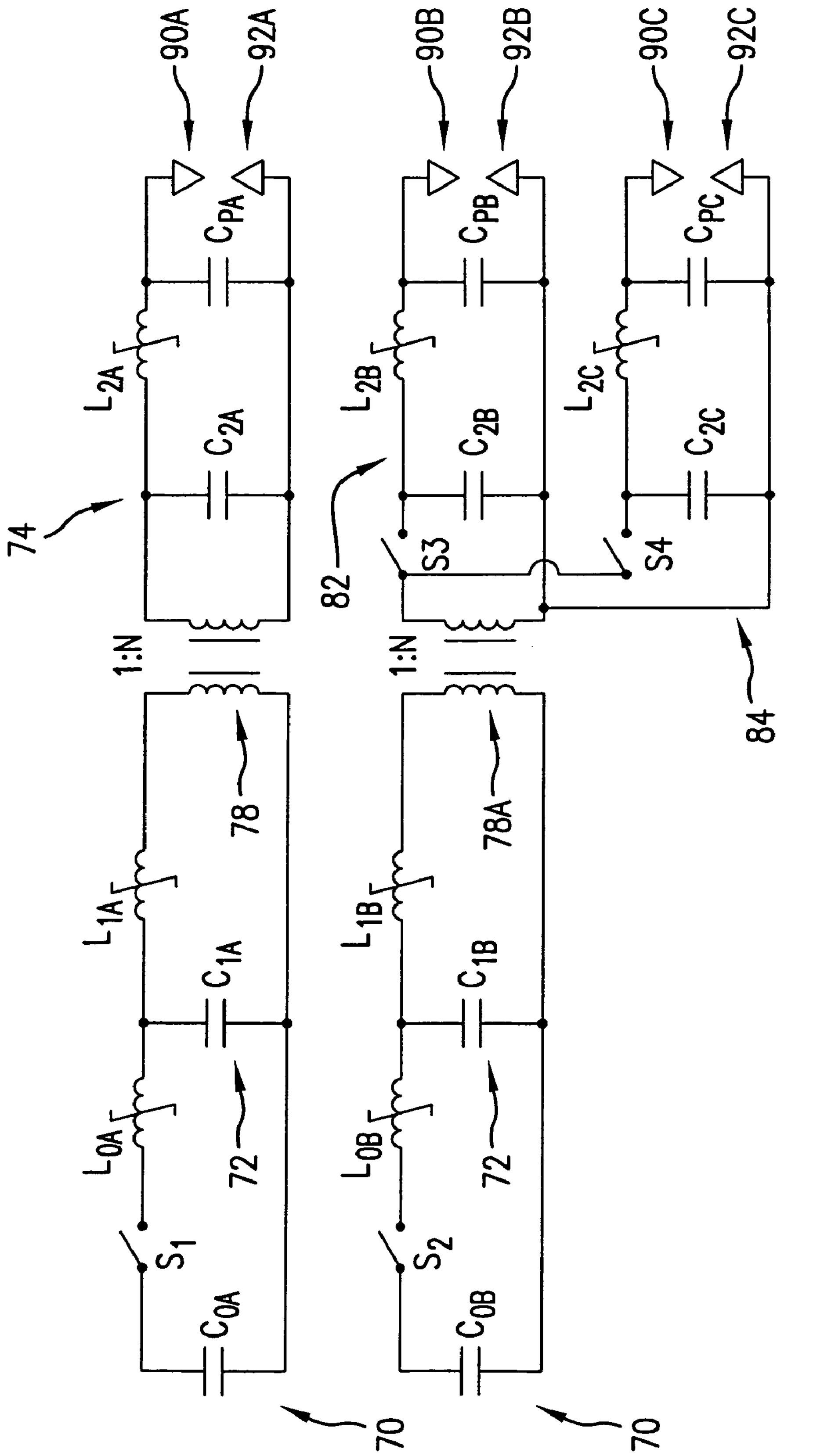

Turning now to FIG. 3A there is shown a solid state pulse power module 60 according to aspects of an embodiment of the present invention which may incorporate, e.g., a charging capacitor $C_0$ 70 that is the input, through a solid state switch $S_1$ to a first stage of a commutator module 80. Upon the closing of switch $S_1$ once the charging capacitor $C_0$ is fully charge, by a resonant charger (not shown) the second stage capacitor $C_1$ is charged through a magnetic saturable reactor $L_o$, which compresses the pulse. When the charge on second stage capacitor $C_1$ is sufficient to close a second magnetically saturable reactor switch $L_1$, by saturating the switch magnetically, the charge on the second stage capacitor $C_1$ in the commutator section 80 is stepped up in one of a pair of fractional winding step up transformers 78A, 78B, e.g., containing N (or M) single winding primary coils in parallel and a single winding secondary, such that the voltage output is stepped up N (or M) times, where N may equal M. The transformers 78A, 78B may be, e.g., connected in parallel to the output of the second compression stage of the commutator section 80, i.e., the output of $L_1$.

The stepped-up voltage output of the transformer 78A may be, e.g., connected to the input of a compression head stage comprising, e.g., a capacitor C2A and a magnetically saturable reactor switch $L_{2A}$, the output of which may be connected to a peaking capacitor $C_P$, which may be, e.g., connected across the electrodes of the MO System 18, 90A and 92A. The stepped-up voltage output of the transformer 78B may, e.g., be connected in parallel to a compression head 82 and a compression head 84, each of which may also comprise, e.g., a capacitor $C_{2B}$ and $C_{2c}$ a magnetically saturable reactor switch $L_{2B}$ and $L_{2C}$, respectively and a respective peaking capacitor $C_{PB}$ and $C_{PC}$. The respective peaking capacitors $C_{PB}$ and $C_{PC}$ may be connected to respective PA chamber(s) electrodes 90B, 92B and 90C, 92C. Which of the electrode pairs 90B, 92B or 90C, 92C will receive the output of the respective compression head 82, 84 each time the electrodes 90A, 92A of the MO system 18 receive an electric pulse from $C_{PA}$ may be determined, e.g., by solid state switches $S_3$ and $S_4$.

In this way, the PA chamber(s) with their respective electrode pairs 90B, 92B and 90C, 92C may be alternatively selected for producing a gas discharge for a given MO laser output pulse 14A.

It will be understood by those skilled in the art that by the arrangement according to aspects of an embodiment of the present invention, the MO may be optimized for line narrowing as is well understood in the art of molecular fluorine or excimer gas discharge MOPA laser configurations and the PA chamber(s) may be optimized for current state of the art pulse repetition operation, e.g., around 4 KHz or so, allowing for the overall system 10 to achieve very high repetition rates of, e.g., 8 KHz and above without exceeding critical performance parameters which currently prevent a single chamber PA system from operating at any anywhere near, e.g., 8 KHz, e.g., fan speed, fan temperature, fan vibration, etc. necessary for operating at around 8 KHz with a single set of PA electrodes. It will also be understood, that the relatively low power MO operation may relatively easily be brought up to pulse repetition rates of around, e.g., 8 KHz and still output a line narrowed relatively low power output beam 14A at such very high pulse repetition rates.

Figure 3C:
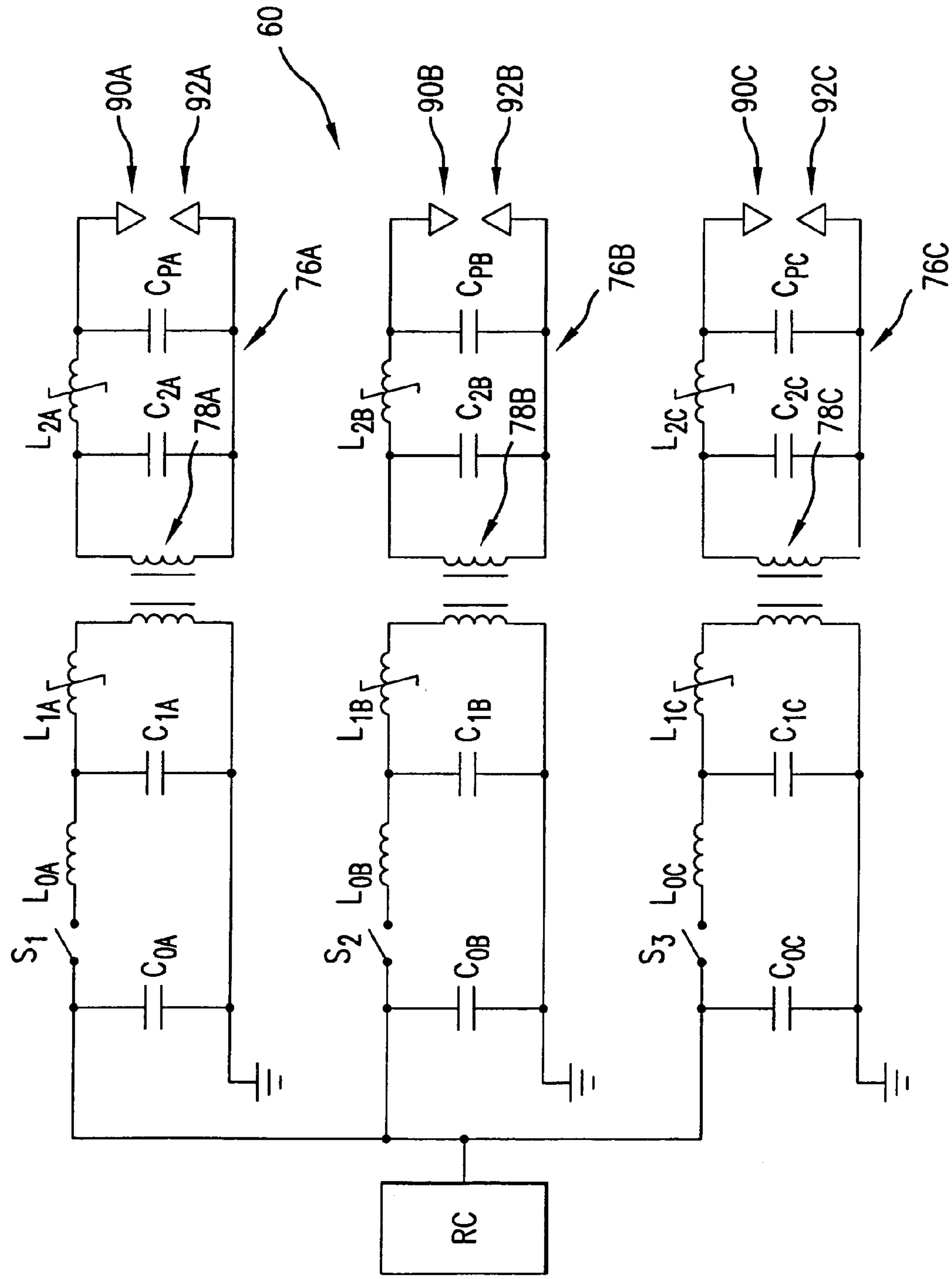

Turning now to FIG. 3C there is shown another embodiment of a pulse power system 60 wherein there are three parallel circuits, each with a $C_0$, $C_{0A}$, $C_{0B}$, and $C_{0C}$, and with three step up transformers 78A, 78B and 78C and three compression heads 76A, 76B and 76C. In such an embodiment, e.g., the timing of the closing of switch $S_1$, which may be to the compression head 76A for the MO chamber and may be closed in time to discharge the electrodes in the MO chamber, e.g., at 8 KHz for the and the switches $S_2$ and $S_3$ may be closed alternately at rates of, e.g., 4 KHz to alternately fire the electrodes 90B, 92B and 90C, 92C in the two PA sections, e.g., 20A1 and 20A2.

It will further be understood that the arrangement according to aspects of embodiments of the present invention may be configured as noted above and in other manners, e.g., the magnetic switching circuits may be employed in conjunction with a single compression head being charge at a rate of 8 KHz, the same as a corresponding compression head for the MO chamber, to switch, downstream of the step-up transformer 78, i.e., on the very high voltage side of the step-up transformer, to charge respective peaking capacitors on the PA module, e.g., for the electrodes 90B, 92B and 90C, 92C alternately at rates of, e.g., 4 KHz.

In operation therefore, the laser system according to aspects of an embodiment of the present invention may take advantage of the relative simplicity of running, e.g., a MO chamber at, e.g., 8 KHz+while still being able to take advantage of a PA configuration, i.e., e.g., the wider discharge for multiple passes for amplification and not suffer the consequences of, among other things, trying to clear the wider discharge electrode discharge region pulse to pulse as rates of higher than about 4 KHz.

Figure 4:
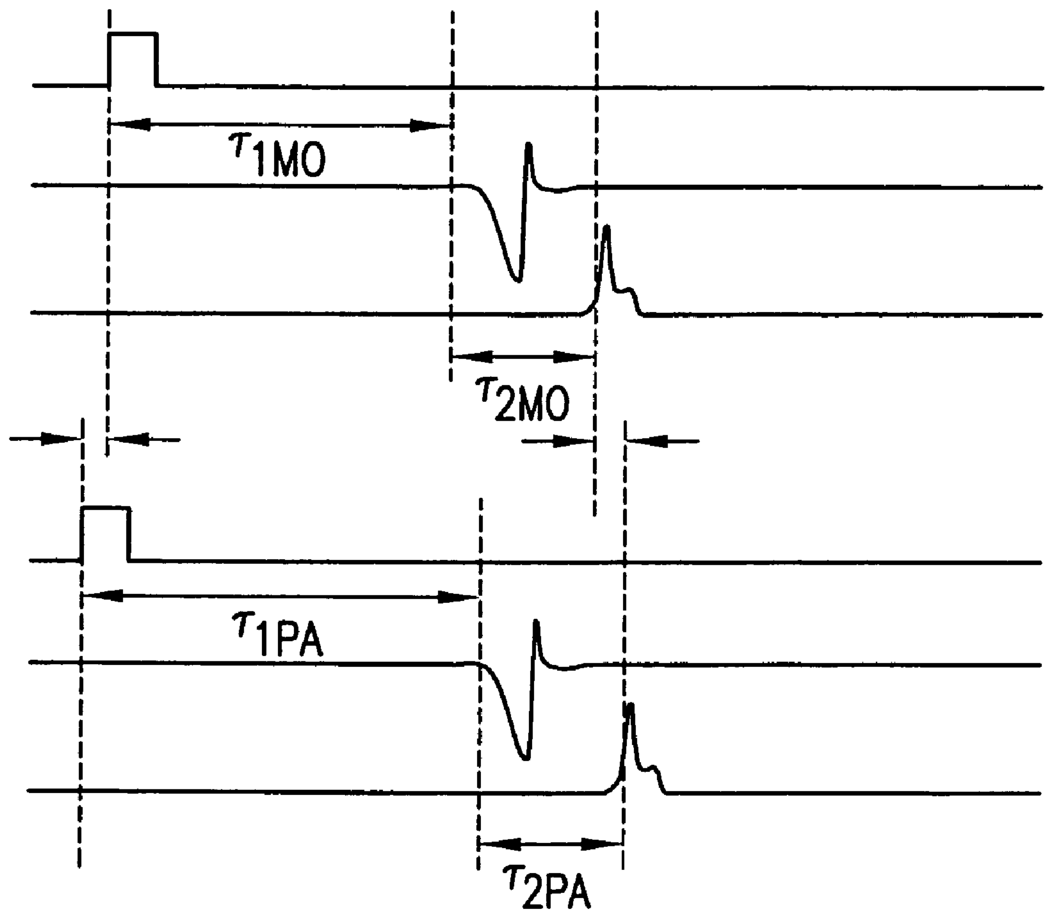

FIG. 4 shows a timing diagram for the firing of an MO chamber gas discharge and a PA gas discharge, for a single pair of electrodes in the PA, with the only difference being according to an aspect of an embodiment of the present invention being that the PA electric discharge at $\tau_{1PA}$ plus $\tau_{2PA}$ will occur alternatively between electrodes 90B, 92B and 90C, 92C, with perhaps a slight adjustment to $\tau_{1PA}$ to account for the delay in the beam 14A passing through electrodes 90B, 92B to reach electrodes 90C, 92C when the discharge is to be between electrodes 90C, 92C according to aspects of an embodiment of the present invention.

It will also be understood by those skilled in the art that there may be applications for the present invention in which line narrowing is not crucial, but high power output at very high repetition rates, even up to 10 KHz and above may be required, e.g., for the driving laser of an LPP EUV light source. In this event, e.g., the beam delivery unit 40 discussed above may not deliver the laser beam 14C to a lithography tool per se, but to an EUV light source that in turn delivers EUV light to a lithography tool. In that event, e.g., the line narrowing module 18B may not be required according to aspects of an embodiment of the present invention and, e.g., also the Sam 29 may not be required to measure, e.g., the bandwidth of the beam 14B, and only, e.g., beam direction and pointing need be controlled, e.g., in the BDU 40.

According to aspects of an embodiment of the present invention if the MO beam were made, e.g., roughly half as wide as the PA discharge(s), then a double pass of the PA chamber(s) electrodes, 90B, 92B and 90C, 92C can be performed to essentially entirely sweep the gain in the PA chamber(s). As noted above, this effectively separates high repetition rate problems in reaching, e.g., 8–10 KHz from high power problems.

Another possibility according to aspects of an embodiment of the present invention may be, e.g., to use a single PA chamber 20 with a single set of paired electrodes, e.g., 90B, 92B also configured as a line narrowed oscillator, i.e., having a LNM (not shown) and alternately firing the laser chamber electrodes in an inter-digitated fashion ("tic-toc" fashion) to achieve a narrow band output at very high repetition rates, e.g., 10–16 KHz. This would sacrifice pulse power in each pulse, but could achieve very very high pulse repetition rates, e.g., using a combiner, e.g., a polarizing combiner (not shown) to recombine the two narrow band output beams (not shown) from the two oscillators into a single output beam.

It will also be understood by those skilled in the art that aspects of an embodiment of the present invention may be used, e.g., to achieve a pulse repetition rate of, e.g., about 6 KHz, e.g., using an MO firing at 6 KHz and two PA, each firing at 3 KHz, or other possible combinations for pulse repetition rates o, e.g., greater than 4 KHz.

Figure 5:
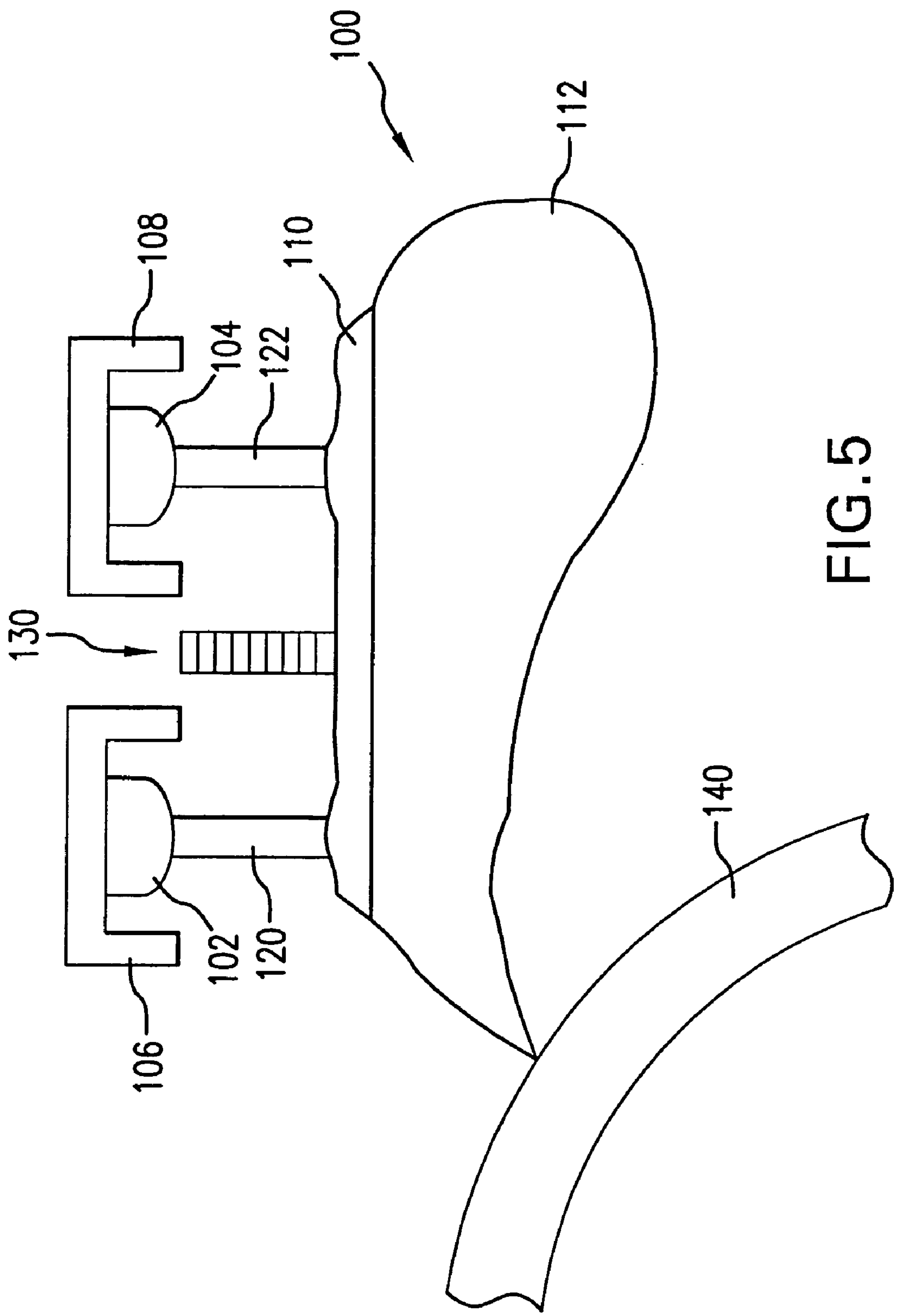
FIG. 5 shows partly schematically aspects of an embodiment of the present invention utilizing two parallel gas discharge regions.

Turning now to FIG. 5 there is shown schematically an alternative embodiment according to aspects of an embodiment of the present invention. In FIG. 5 three is shown and embodiment of a dual electrode system 100, which may comprise, e.g. a first cathode 102 and a second cathode 104 which may be positioned, e.g., in a single chamber each with a respective main insulator 106, 108. The two electrodes along with a single anode 110, having appropriately formed anode discharge regions opposite the respective cathode 102, 104 form elongated electrode pairs within the chamber and define elongated discharge regions 120, 122 (into the plane of the paper). The anode 110 may be positioned on an anode support 112. The cathode and single anode may be formed, with or without insulation, e.g., a ceramic insulator, between discharge regions. The cathodes 102, 104 may be separated by an elongated converter, e.g., a catalytic converter 130 for transforming, e.g., F into $F_2$ between the discharge 120 and the discharge 122. Laser gas may be circulated between the electrodes 120, 110 and 122,110 and the respective discharge regions 120 122 by a fan 140.

Figure 6:
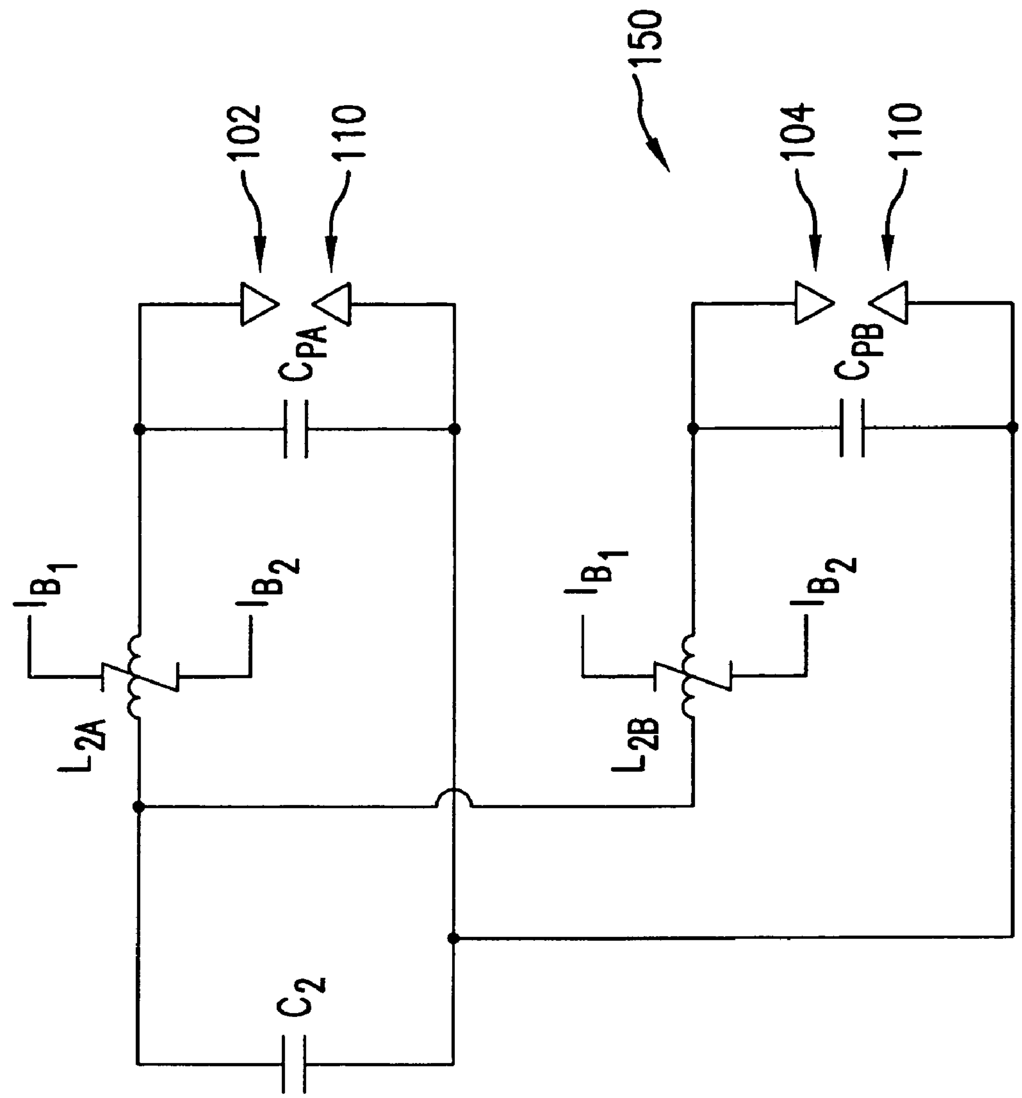
FIG. 6 shows schematically a compression head portion of a a pulse power system according to aspects of an embodiment of the present invention useable with the embodiment of FIG. 5; and, FIG. 7 shows schematically aspects of an embodiment of an optical system useable with the embodiment of FIG. 5.

An electric discharge may be created alternatively between the electrodes 120, 110 and 122, 110 respectively creating gas discharges in the discharge regions 120, 122 by a power supply system 150, e.g., as shown in FIG. 6, which is a modification of the system shown, e.g., in FIG. 3A, wherein a single compression head capacitor $C_2$ may be charged at a rate of, e.g., 8 Khz and the circuit 150 provide alternating electric discharge voltages on respective peaking capacitors CPA and CPB through respective magnetically saturable reactor switches $L_{2A}$ and $L_{2B}$. The switches $L_{2A}$ and $L_{2B}$ may be switched between oppositely directed biasing currents from bias current sources $I_{B1}$ and $I_{B2}$, e.g., at 8 KHz, utilizing a suitable switching circuit (not shown) to cause the charge on $C_2$ alternatively to be dumped on $C_{PA}$ and $C_{PB}$ at the desired, e.g., 8 KHz.

Figure 7:
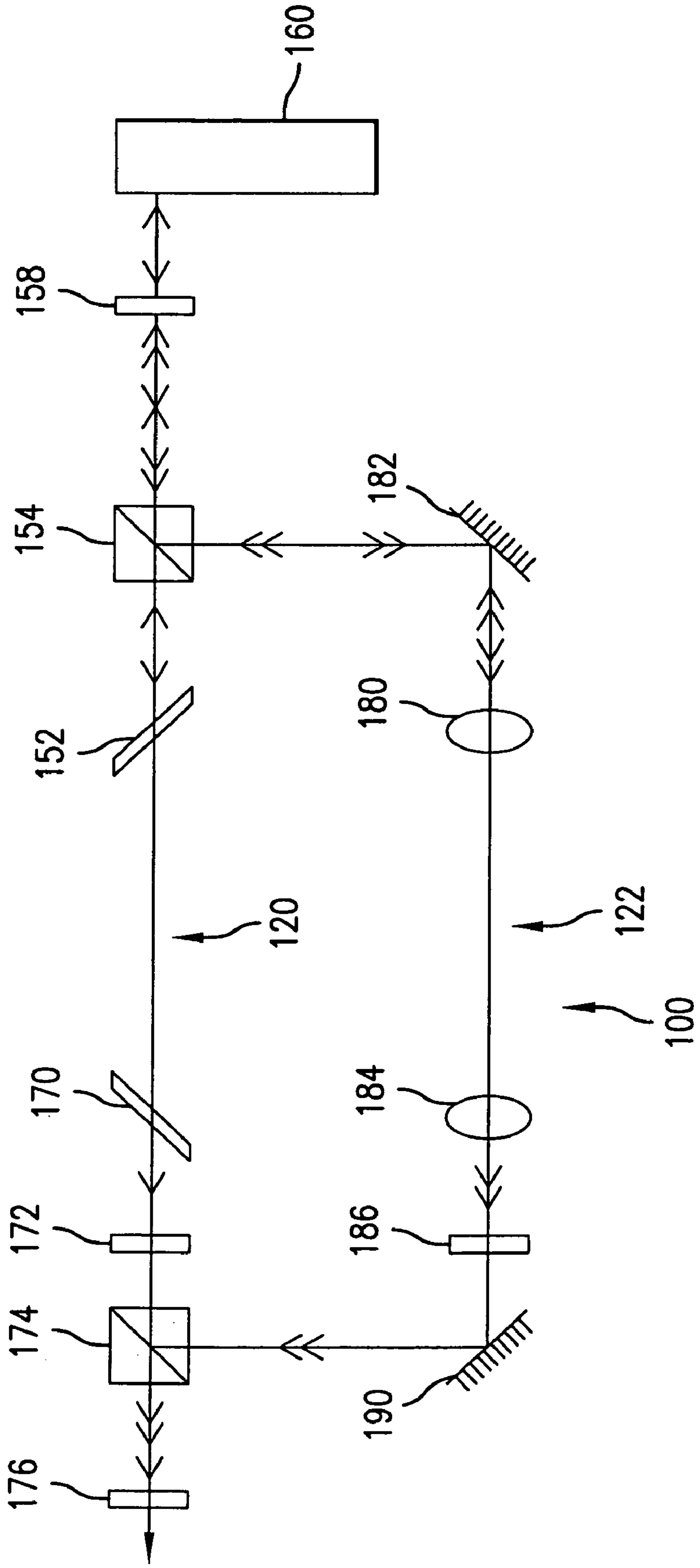

Turning now to FIG. 7 there is shown schematically aspects of an embodiment of the present invention shown in FIGS. 5 and 6 wherein, e.g., only one line narrowing package 160 is needed. As shown in FIG. 7, the first discharge light, indicated by single arrows, may pass, e.g., through a rear window 152 in, e.g., an oscillating cavity, which may be oriented according to the polarization of the light desired to pass through that window, 152, e.g., a first polarization direction and into and through a polarizing beam splitter that is essentially transparent to light of the first polarization direction. The light from the discharge 120 may then pass into a line narrowing package 160 configured for operation with light of the first polarization direction through a half wave plate 158 or other polarizing mechanism that, e.g., may be a rotating half wave plate 158 that is rotated at the pulse repetition rage of the laser system 100, such that when the light from the discharge 120 is traversing from and to the line narrowing package, the half wave plate 158 is not in the optical path. It will be understood that the polarizing mechanism may also be, e.g., an electrically or magnetically or mechanically or otherwise actuated optical element, that can be, e.g., periodically switched (actuated) to pass light of one polarizing direction, e.g., the first polarizing direction, or another, e.g., the second polarizing direction.

Similarly, the laser light pulses produced in the discharge 122 in laser system 100 may be passed through, e.g., a rear window 180 that may be, e.g., oriented to pass light of a different polarization direction, e.g., a second polarization direction, indicated by double arrows, which may then be reflected by a mirror 182 that is essentially totally reflective of the light of the second polarization direction and onto the polarizing beam splitter that is essentially totally reflective of the light of the second polarization direction and then through the polarizing mechanism 158, e.g., the half wave plate, which in the case of the light from the discharge region 122 may convert the light from the second polarization direction to the first polarization direction for line narrowing in the line narrowing package 160. Upon return from the line narrowing package 160, this light from the discharge region 122 may again pass through the polarizing mechanism, e.g., half wave plate 158 and be again converted back to the second polarization direction for passage pack through the resonance cavity of the discharge 122, e.g., through a front window 184 oriented for the second polarization direction and the reflecting mirror 190 essentially totally reflective for light of the second polarization direction and not to, e.g., a polarizing beam splitter 174 that is essentially totally transparent to the light of the first polarization direction exiting the output couple of the cavity of discharge region 120 and totally reflective of the light of the second polarization direction exiting the output coupler 186 of the resonance cavity of the discharge region 122. Another polarizing mechanism 176, similar to that referenced above in regard to polarizing mechanism 158, may intermittently also change the polarization of either the light of the first polarization direction from the resonance cavity of the discharge region 120 to the second polarization direction of the light of the discharge region 122, to produce an output of a selected polarization direction, e.g., the first polarization direction.

In operation according to aspects of an embodiment of the present invention there is provided a method and apparatus for the delivery of pulsed energy to the two sets of paired gas discharges, e.g., in two PA sections that may comprise a compression head (capacitive storage with electrical pulse-compression utilizing a saturable reactor magnetic switch. Between the peaking capacitors (final stage a across the electrodes) and the compression head each of the paired discharges may have a separate saturable magnetic switch, which may be biased in such an opposite fashion as to have each of the paired discharge electrodes operate at, e.g., half of the total output repetition rate that the compression head (and the MO chamber) experiences. The biasing power requirements for a biasing power supply can be used to switch many (multiple) discharge regions. The discharges, e.g., in the PA sections may be in a single chamber or more than one chamber and the same resonance charger may drive both the MO chamber discharges and the PA chamber(s) discharge at 8 KHz (CO charging), while the PA electrodes are alternately fired at, e.g., 4 KHz.

It will be understood by those skilled in the art that modification of the polarization of the output of the laser system 100 may occur, e.g., in the BDU 40, or may occur downstream even of the BDU, e.g., inside of a lithography tool. It will also be understood that the laser system 100 could be configured, e.g., along with a single or multiple, e.g., double chambered (double discharge region) power amplifier or even power oscillator to produce MOPA and/or MOPO configurations and/or that the system 100 could be a PO in a MOPO, e.g., receiving MO output pulses at the ultimate output pulse repetition rate of the entire MOPO system and interdigitated between the discharge region 120 and the discharge region 122 each operating at one half the ultimate output pulse repetition rate of the, e.g., MOPO system. Further such a configuration could easily be modified to operate as a very high repetition rate POPO system.

We claim:

1. A very high repetition rate gas discharge laser system in a MOPA configuration comprising:

a master oscillator gas discharge laser system producing a beam of oscillator laser output light pulses at a very high pulse repetition rate;

at least two power amplification gas discharge laser systems receiving laser output light pulses from the master oscillator gas discharge laser system and each of the at least two power amplification gas discharge laser systems amplifying some of the received laser output light pulses at a pulse repetition that is a fraction of the very high pulse repetition rate equal to one over the number of the at least two power amplification gas discharge laser systems to form an amplified output laser light pulse beam at the very high pulse repetition rate.

2. The apparatus of claim 1 further comprising:

the at least two power amplification gas discharge laser systems comprises two power amplification gas discharge laser systems.

3. The apparatus of claim 1 further comprising:

the at least two power amplification gas discharge lasers systems are positioned in series with respect to the oscillator laser output light pulse beam.

4. The apparatus of claim 2 further comprising:

the at least two power amplification gas discharge lasers systems are positioned in series with respect to the oscillator laser output light pulse beam.

5. The apparatus of claim 3 further comprising:

the master oscillator gas discharge laser system fires at a pulse repetition rate of x≧4000 Hz;

each power amplification gas discharge laser fires at ½ x.

6. The apparatus of claim 4 further comprising: the master oscillator gas discharge laser system fires at a pulse repetition rate of x≧4000 Hz;

each power amplification gas discharge laser fires at ½ x.

7. The apparatus of claim 3 further comprising:

the master oscillator gas discharge laser system fires at a pulse repetition rate of x≧5000 Hz;

each power amplification gas discharge laser fires at ½ x.

8. The apparatus of claim 4 further comprising:

the master oscillator gas discharge laser system fires at a pulse repetition rate of x≧5000 Hz;

each power amplification gas discharge laser fires at ½ x.

9. The apparatus of claim 5 further comprising:

a beam delivery unit connected to the laser light output of the power amplification laser system and directing to output of the power amplification laser system to an input of a light utilization tool and providing at least beam pointing and direction control.

10. The apparatus of claim 6 further comprising:

a beam delivery unit connected to the laser light output of the power amplification laser system and directing to output of the power amplification laser system to an input of a light utilization tool and providing at least beam pointing and direction control.

11. The apparatus of claim 7 further comprising:

a beam delivery unit connected to the laser light output of the power amplification laser system and directing to output of the power amplification laser system to an input of a light utilization tool and providing at least beam pointing and direction control.

12. The apparatus of claim 8 further comprising:

a beam delivery unit connected to the laser light output of the power amplification laser system and directing an output of the power amplification laser system to an input of a light utilization tool and providing at least beam pointing and direction control.

13. A lithography tool comprising:

a very high repetition rate gas discharge laser system in a MOPA configuration comprising:

a master oscillator gas discharge laser system producing a beam of oscillator laser output light pulses at a very high pulse repetition rate;

at least two power amplification gas discharge laser systems receiving laser output light pulses from the master oscillator gas discharge laser system and each of the at least two power amplification gas discharge laser systems amplifying some of the received laser output light pulses at a pulse repetition that is a fraction of the very high pulse repetition rate, equal to one over the number of the at least two power amplification gas discharge laser systems, to form an amplified output laser light pulse beam at the very high pulse repetition rate.

14. The apparatus of claim 13 further comprising:

the at least two power amplification gas discharge laser systems is two power amplification gas discharge laser systems.

15. The apparatus of claim 13 further comprising:

the at least two power amplification gas discharge lasers systems are positioned in series with respect to the oscillator laser output light pulse beam.

16. The apparatus of claim 14 further comprising:

the at least two power amplification gas discharge lasers systems are positioned in series with respect to the oscillator laser output light pulse beam.

17. The apparatus of claim 15 further comprising:

the master oscillator gas discharge laser system fires at a pulse repetition rate of x≧4000 Hz;

each power amplification gas discharge laser fires at ½ x.

18. The apparatus of claim 16 further comprising:

the master oscillator gas discharge laser system fires at a pulse repetition rate of x≧4000 Hz;

each power amplification gas discharge laser fires at ½ x.

19. The apparatus of claim 15 further comprising:

the master oscillator gas discharge laser system fires at a pulse repetition rate of x≧5000 Hz;

each power amplification gas discharge laser fires at ½ x.

20. The apparatus of claim 16 further comprising:

the master oscillator gas discharge laser system fires at a pulse repetition rate of x≧5000 Hz;

each power amplification gas discharge laser fires at ½ x.

21. The apparatus of claim 15 further comprising:

a beam delivery unit connected to the laser light output of the power amplification laser system and directing an output of the power amplification laser system to an input of a light utilization tool and providing at least beam pointing and direction control.

22. The apparatus of claim 16 further comprising:

a beam delivery unit connected to the laser light output of the power amplification laser system and directing to output of the power amplification laser system to an input of a light utilization tool and providing at least beam pointing and direction control.

23. The apparatus of claim 17 further comprising:

a beam delivery unit connected to the laser light output of the power amplification laser system and directing to output of the power amplification laser system to an input of a light utilization tool and providing at least beam pointing and direction control.

24. The apparatus of claim 18 further comprising:

a beam delivery unit connected to the laser light output of the power amplification laser system and directing an output of the power amplification laser system to an input of a light utilization tool and providing at least beam pointing and direction control.

25. A laser produced plasma EUV light source comprising:

a very high repetition rate gas discharge laser system in a MOPA configuration comprising:

a master oscillator gas discharge laser system producing a beam of oscillator laser output light pulses at a very high pulse repetition rate;

at least two power amplification gas discharge laser systems receiving laser output light pulses from the master oscillator gas discharge laser system and each of the at least two power amplification gas discharge laser systems amplifying some of the received laser output light pulses at a pulse repetition that is a fraction of the very high pulse repetition rate, equal to one over the number of the at least two power amplification gas discharge laser systems, to form an amplified output laser light pulse beam at the very high pulse repetition rate.

26. The apparatus of claim 25 further comprising:

the at least two power amplification gas discharge laser systems is two power amplification gas discharge laser systems.

27. The apparatus of claim 25 further comprising:
the at least two power amplification gas discharge lasers systems are positioned in series with respect to the oscillator laser output light pulse beam.

28. The apparatus of claim 26 further comprising:
the at least two power amplification gas discharge lasers systems are positioned in series with respect to the oscillator laser output light pulse beam.

29. The apparatus of claim 27 further comprising:
the master oscillator gas discharge laser system fires at a pulse repetition rate of $x \geqq 4000$ Hz;
each power amplification gas discharge laser fires at ½ x.

30. The apparatus of claim 28 further comprising:
the master oscillator gas discharge laser system fires at a pulse repetition rate of $x \geqq 4000$ Hz;
each power amplification gas discharge laser fires at ½ x.

31. The apparatus of claim 27 further comprising:
the master oscillator gas discharge laser system fires at a pulse repetition rate of $x \geqq 5000$ Hz;
each power amplification gas discharge laser fires at ½ x.

32. The apparatus of claim 28 further comprising:
the master oscillator gas discharge laser system fires at a pulse repetition rate of $x \geqq 5000$ Hz;
each power amplification gas discharge laser fires at ½ x.

33. The apparatus of claim 29 further comprising:
a beam delivery unit connected to the laser light output of the power amplification laser system and directing to output of the power amplification laser system to an input of a light utilization tool and providing at least beam pointing and direction control.

34. The apparatus of claim 30 further comprising:
a bean delivery unit connected to the laser light output of the power amplification laser system and directing an output of the power amplification laser system to an input of a light utilization tool and providing at least beam potting and direction control.

35. The apparatus of claim 31 further comprising:
a beam delivery unit connected to the laser light output of the power amplification laser system and directing an output of the power amplification laser system to an input of a light utilization tool and providing at least beam pointing and direction control.

36. The apparatus of claim 32 further comprising:
a beam delivery unit connected to the laser light output of the power amplification laser system and directing an output of the power amplification laser system to an input of a light utilization tool and providing at least beam pointing and direction control.

37. A method of producing a very high repetition rate gas discharge laser system in a MOPA configuration comprising:
utilizing a master oscillator gas discharge laser system, producing a beam of oscillator laser output light pulses at a very high pulse repetition rate;
utilizing at least two power amplification gas discharge laser systems, receiving laser output light pulses from the master oscillator gas discharge laser system and, in each of the at least two power amplification gas discharge laser systems, amplifying some of the received laser output light pulses at a pulse repetition that is a fraction of the very high pulse repetition rate equal to one over the number of the at least two power amplification gas discharge laser systems to form an amplified output laser light pulse beam at the very high pulse repetition rate.

38. The method of claim 37 further comprising:
the at least two power amplification gas discharge laser systems comprises two power amplification gas discharge laser systems.

39. The method of claim 37 further comprising:
the at least two power amplification gas discharge lasers systems are positioned in series with respect to the oscillator laser output light pulse beam.

40. The method of claim 38 further comprising:
the at least two power amplification gas discharge lasers systems are positioned in series with respect to the oscillator laser output light pulse beam.

41. The method of claim 37 further comprising:
utilizing a beam delivery unit connected to the laser light output of the power amplification laser system, directing an output of the power amplification laser system to an input of a light utilization tool and providing at least beam pointing and direction control.

42. The method of claim 38 further comprising:
utilizing a beam delivery unit connected to the laser light output of the power amplification laser system, directing an output of the power amplification laser system to an input of a light utilization tool and providing at least beam pointing and direction control.

43. The method of claim 39 further comprising:
utilizing a beam delivery unit connected to the laser light output of the power amplification laser system, directing to output of the power amplification laser system to an input of a light utilization tool and providing at least beam pointing and direction control.

44. The method of claim 40 further comprising:
utilizing a beam delivery unit connected to the laser light output of the power amplification laser system, directing an output of the power amplification laser system to an input of a light utilization tool and providing at least beam pointing and direction control.

45. A method of performing integrated circuit lithography comprising:
utilizing a method for producing a very high repetition rate gas discharge laser system in a MOPA configuration comprising the steps of:
utilizing a master oscillator gas discharge laser system, producing a beam of oscillator laser output light pulses at a very high pulse repetition rate;
utilizing at least two power amplification gas discharge laser systems, receiving laser output light pulses from the master oscillator gas discharge laser system and, in each of the at least two power amplification gas discharge laser systems, amplifying some of the received laser output light pulses at a pulse repetition that is a fraction of the very high pulse repetition rate equal to one over the number of the at least two power amplification gas discharge laser systems to form an amplified output laser light pulse beam at the very high pulse repetition rate.

46. The method of claim 45 further comprising:
the at least two power amplification gas discharge laser systems comprises two power amplification gas discharge laser systems.

47. The method of claim 45 further comprising:
the at least two power amplification gas discharge lasers systems are positioned in series with respect to the oscillator laser output light pulse beam.

48. The method of claim 46 further comprising:
the at least two power amplification gas discharge lasers systems are positioned in series with respect to the oscillator laser output light pulse beam.

49. The method of claim 45 further comprising:

utilizing a beam delivery unit connected to the laser light output of the power amplification laser system, directing an output of the power amplification laser system to an input of a light utilization tool and providing at least beam pointing and direction control.

50. The method of claim 46 further comprising:

utilizing a beam delivery unit connected to the laser light output of the power amplification laser system, directing an output of the power amplification laser system to an input of a light utilization tool and providing at least beam pointing and direction control.

51. The method of claim 47 further comprising:

utilizing a beam delivery unit connected to the laser light output of the power amplification laser system, directing an output of the power amplification laser system to an input of a light utilization tool and providing at least beam pointing and direction control.

52. The method of claim 48 further comprising:

utilizing a beam delivery unit connected to the laser light output of the power amplification laser system, directing an output of the power amplification laser system to an input of a light utilization tool and providing at least beam pointing and direction control.

53. A method of producing EUV light utilizing a laser produced plasma comprising:

utilizing a very high repetition rate gas discharge laser system in a MOPA configuration comprising:

utilizing a master oscillator gas discharge laser system, producing a beam of oscillator laser output light pulses at a very high pulse repetition rate;

utilizing at least two power amplification gas discharge laser systems, receiving laser output light pulses from the master oscillator gas discharge laser system and, in each of the at least two power amplification gas discharge laser systems, amplifying some of the received laser output light pulses at a pulse repetition that is a fraction of the very high pulse repetition rate equal to one over the number of the at least two power amplification gas discharge laser systems to form an amplified output laser light pulse beam at the very high pulse repetition rate.

54. The method of claim 53 further comprising:

the at least two power amplification gas discharge laser systems comprises two power amplification gas discharge laser systems.

55. The method of claim 54 further comprising:

the at least two power amplification gas discharge lasers systems are positioned in series with respect to the oscillator laser output light pulse beam.

56. The apparatus of claim 55 further comprising:

the at least two power amplification gas discharge lasers systems are positioned in series with respect to the oscillator laser output light pulse beam.

57. The method of claim 53 further comprising:

utilizing a beam delivery unit connected to the laser light output of the power amplification laser system, directing an output of the power amplification laser system to an input of a light utilization tool and providing at least beam pointing and direction control.

58. The method of claim 54 further comprising:

utilizing a beam delivery unit connected to the laser light output of the power amplification laser system, directing to output of the power amplification laser system to an input of a light utilization tool and providing at least beam pointing and direction control.

59. The meted of claim 55 further comprising:

utilizing a beam delivery unit connected to the laser light output of the power amplification laser system, directing an output of the power amplification laser system to an input of a light utilization tool and providing at least beam pointing and direction control.

60. The method of claim 56 further comprising:

utilizing a beam delivery unit connected to the laser light output of the power amplification laser system, directing an output of the power amplification laser system to an input of a light utilization tool and providing at least beam pointing and direction control.

* * * * *

UNITED STATES PATENT AND TRADEMARK OFFICE

CERTIFICATE OF CORRECTION

PATENT NO. : 7,006,547 B2

DATED : February 28, 2006

INVENTOR(S) : Thomas D. Steiger et al.

It is certified that error appears in the above-identified patent and that said Letters Patent is hereby corrected as shown below:

Title page,

Item [75], Inventors, delete ", Edward P. Holtaway, Carlsbad, CA (US); Bryan Moosman, San Marcos, CA (US); Rajasekhar M. Rao, San Diego, CA (US)".

Signed and Sealed this

Sixth Day of June, 2006

JON W. DUDAS

*Director of the United States Patent and Trademark Office*